US011572799B2

United States Patent
Wu et al.

(10) Patent No.: US 11,572,799 B2
(45) Date of Patent: Feb. 7, 2023

(54) DETECTION DEVICE FOR TURBINE BLADE OF AIRCRAFT ENGINE

(71) Applicant: JIANGSU JIANGHANGZHI AIRCRAFT ENGINE COMPONENTS RESEARCH INSTITUTE CO., LTD., Nanjing (CN)

(72) Inventors: Jiang Wu, Nanjing (CN); Chunxiao Cao, Nanjing (CN); Xiaolin Yan, Nanjing (CN)

(73) Assignee: JIANGSU JIANGHANGZHI AIRCRAFT ENGINE COMPONENTS RESEARCH INSTITUTE CO., LTD., Nanjing (CN)

(*) Notice: Subject to any disclaimer, the term of this patent is extended or adjusted under 35 U.S.C. 154(b) by 0 days.

(21) Appl. No.: 17/701,713

(22) Filed: Mar. 23, 2022

(65) Prior Publication Data
US 2022/0213803 A1  Jul. 7, 2022

Related U.S. Application Data

(63) Continuation of application No. PCT/CN2021/081197, filed on Mar. 17, 2021.

(30) Foreign Application Priority Data

Oct. 21, 2020  (CN) .......................... 202011131284.X

(51) Int. Cl.
*F01D 21/00* (2006.01)
*F01D 5/18* (2006.01)
(Continued)

(52) U.S. Cl.
CPC ............ *F01D 21/003* (2013.01); *F01D 5/186* (2013.01); *G01M 3/025* (2013.01); *G01M 3/20* (2013.01); *F05D 2260/202* (2013.01); *F05D 2260/80* (2013.01)

(58) Field of Classification Search
CPC ...... F01D 21/003; F01D 5/186; G01M 3/025; G01M 3/20; G01M 15/14; F05D 2260/202; F05D 2260/80
See application file for complete search history.

(56) References Cited

U.S. PATENT DOCUMENTS 3,624,397 A * 11/1971 Honeycutt ........... G01N 23/043
                                                  250/483.1
5,054,087 A * 10/1991 Carbon ............ G01N 21/95692
                                                  382/256
(Continued)

FOREIGN PATENT DOCUMENTS

CN    103048122 A    4/2013
CN    103052877 A    4/2013
(Continued)

OTHER PUBLICATIONS

Ma Jianhui, et al., The in-situ detection of aero-engine turbine blade with endoscope and fluorescence penetration, Sichuan Gas Turbine Research Institute of AECC, 2020, pp. 50-53, vol. 42 No. 6.

*Primary Examiner* — Courtney D Heinle
*Assistant Examiner* — Danielle M. Christensen
(74) *Attorney, Agent, or Firm* — Metis IP LLC

(57) ABSTRACT

A detection device for a turbine blade of an aircraft engine includes a machine table, a fixing frame, a dip coating mechanism, and a detection mechanism. A sliding cavity is formed in an upper end of the machine table, a support plate is slidably arranged in the sliding cavity, a side end of the support plate is rotatably connected to a chuck, the fixing frame is in an inverted "U" shape and is fixed on the upper end of the machine table, and a mounting barrel is rotatably arranged on the fixing frame. The dip coating mechanism and the detection mechanism are arranged on the machine table, such that wall-hanging sediments in an air film hole and a cooling channel will be exposed to a first photosen- (Continued)

sitive camera and a second photosensitive camera through fluorescent liquid, thus completing wall hanging and blockage detection of the blade synchronously.

7 Claims, 6 Drawing Sheets

(51) Int. Cl.
  *G01M 3/02* (2006.01)
  *G01M 3/20* (2006.01)

(56) References Cited

U.S. PATENT DOCUMENTS

| | | | | |
|---|---|---|---|---|
| 5,773,790 | A | * | 6/1998 | Moore ............... G01N 21/8803 219/121.71 |
| 2004/0149905 | A1 | | 8/2004 | Bowles et al. |

FOREIGN PATENT DOCUMENTS

| | | |
|---|---|---|
| CN | 105293070 A | 2/2016 |
| CN | 205067377 U | 3/2016 |
| CN | 106770389 A | 5/2017 |
| CN | 108106966 A | 6/2018 |
| CN | 108180851 A | 6/2018 |
| CN | 108458860 A | 8/2018 |
| CN | 108507482 A | 9/2018 |
| CN | 207908396 U | 9/2018 |
| CN | 109211864 A | 1/2019 |
| CN | 109357886 A | 2/2019 |
| CN | 109751972 A | 5/2019 |
| CN | 110376212 A | 10/2019 |
| CN | 211603033 U | 9/2020 |
| CN | 112304625 A | 2/2021 |
| JP | 2015114254 A | 6/2015 |

* cited by examiner

DETECTION DEVICE FOR TURBINE BLADE OF AIRCRAFT ENGINE

CROSS REFERENCE TO THE RELATED APPLICATIONS

This application is the continuation application of International Application No. PCT/CN2021/081197, filed on Mar. 17, 2021, which is based upon and claims priority to Chinese Patent Application No. 202011131284.X, filed on Oct. 21, 2020, the entire contents of which are incorporated herein by reference.

TECHNICAL FIELD

The present disclosure relates to the technical field of automatic detection equipment and, in particular, to a detection device for a turbine blade of an aircraft engine.

BACKGROUND

After the high-pressure turbine blade of an aircraft engine operates for a period of time, sand and dust will accumulate in the internal cooling channel and air film hole. After blockage, the blade may be broken due to poor local heat dissipation. The prior blockage detection method is the water spray test. The water spray test entails having a water flow introduced from an air channel inlet at the lower end of the tenon, and then it is observed as to whether there is water flowing out of the cooling channel and an air outlet on the air film hole so as to determine whether there is blockage. Finally the corresponding blockage parts are opened up.

However, there are still certain drawbacks in the prior art during use. I, The cooling channel or the air film hole may not be completely blocked, that is, the wall hanging phenomenon that, the sediments such as sand and dust partially accumulate on the inner wall, but the water flow can completely flow through the void area next to the hanging wall to be flushed out. This method can only detect whether it is completely blocked, but cannot detect whether there is wall hanging. The wall-hanging sediments detected will seriously affect a series of damage detection such as wear, melting, and cracks. II, Each blade on the turbine needs to be disassembled and detected one-by-one, and each air film hole needs to be subjected to blockage detection successively, which is very time-consuming and low in detection efficiency.

SUMMARY

An objective of the present disclosure is to provide a detection device for a turbine blade of an aircraft engine, so as to solve the above problems in the prior art.

A detection device for a turbine blade of an aircraft engine includes a machine table, a fixing frame, a dip coating mechanism, and a detection mechanism. A sliding cavity is formed in an upper end of the machine table, a support plate is slidably arranged in the sliding cavity, a side end of the support plate is rotatably connected to a chuck, the fixing frame is in an inverted "U" shape and is fixed on the upper end of the machine table, a mounting barrel is rotatably arranged on the fixing frame, a plurality of avoidance holes are circumferentially arranged in the mounting barrel, a positioning disc is fixedly arranged on the mounting barrel, a cylinder is mounted in the mounting barrel, an output end of the cylinder is connected to a clamping claw through a connecting piece, the clamping claw is slidably arranged in the avoidance hole, an end of the mounting barrel is also clamped on the chuck, the dip coating mechanism is mounted on the machine table and is configured to dip fluorescent liquid to a body of the turbine blade, and the detection mechanism is mounted on a side end of the machine table and is configured to detect a blockage degree of an air film hole on a turbine.

Preferably, the dip coating mechanism may include a driving motor, a driving member, a driven member and an accommodating tank, the driving motor may be mounted on the machine table through a mounting plate, the driving member may be mounted on an output end of the driving motor, the other end of the driving member may be fixed with a toggle lever, a relief hole may be formed in a side end of the driving member where the toggle lever is located, the side end of the driving member may be further fixed with two symmetrically arranged toggle plates, the driven member may be fixed on the mounting barrel, a plurality of blocking teeth matched with the driving member may be evenly distributed at a side end of the driven member, two symmetrically arranged chutes may be fixed on the machine table, the accommodating tank may be slidably arranged in the chutes, an upper end and a lower end of the accommodating tank may be both limited to ends of the chutes, a side end of the accommodating tank may be fixed with two symmetrically arranged sliding columns, the side end of the accommodating tank may be connected to a first air inlet head, a sliding ring may be slidably arranged on the two sliding columns, a guide rod may be fixedly connected in the sliding ring, the two sliding columns may be both slidably arranged on the guide rod, two symmetrically arranged springs may be sleeved on the guide rod between the sliding column and an inner wall of the sliding ring, a support rod may be fixed on an upper end of the sliding ring, and an abutting piece may be arranged on the other end of the support rod through a torsion spring.

Preferably, the detection mechanism may include an air-jet device, a vortex tube, a light shielding channel, a first photosensitive camera, and a second photosensitive camera; the air-jet device may be mounted at a lower end of the machine table, the vortex tube may be also mounted on the machine table, an air inlet end of the vortex tube may be connected to the air-jet device, a cold air outlet of the vortex tube may be connected to the first air inlet head through a first flexible connecting tube, the light shielding channel may be mounted on the machine table through a mounting table, a second air inlet head may be mounted on the mounting table, a hot air outlet of the vortex tube may be connected to the second air inlet head through a second flexible connecting tube, the first photosensitive camera may be arranged on a curved side end of the light shielding channel, and two second photosensitive cameras may be symmetrically arranged on two plane side ends of the light shielding channel, respectively.

Preferably, an end of the connecting piece may be inclined, an inclined hole may be formed inside the clamping claw and the end of the connecting piece may be slidably arranged in the inclined hole.

Preferably, the lower end of the accommodating tank may be connected to a liquid feeding pump and, when the accommodating tank is moved up to an uppermost position, the turbine blade may just drop below a fluorescent liquid level.

Preferably, end faces of the two toggle plates may be arranged obliquely and, when the abutting piece is not in contact with the toggle plates, the abutting piece may be perpendicular to the support rod under the action of the torsion spring.

Preferably, a width of a groove of the light shielding channel may be not less than a vertical projection width of the turbine blade.

Preferably, a lower end of the groove of the light shielding channel may correspond to an air outlet port of the second air inlet head.

The present disclosure has the following advantages:

(1) According to the present disclosure, the dip coating mechanism and the detection mechanism are arranged on the machine table, such that the driving member rotates for one cycle to drive the engine turbine turntable to rotate synchronously for one cycle. In this process, the two symmetrically-arranged toggle plates will drive the accommodating tank to reciprocate up and down twice, such that the turbine blades on the engine turntable can be immersed twice, so as to ensure that the low-temperature air generated in the vortex tube can have sufficient time to cool the fluorescent liquid, and ensure that the low-temperature fluorescent liquid in the accommodating tank is completely immersed in the small air film holes on the blades. For the blades to be detected, through the second air inlet head mounted on the mounting table, the high-temperature hot air generated in the vortex tube can quickly quench the blade surface, such that wall-hanging sediments in the air film hole and the cooling channel will be exposed to the first photosensitive camera and the second photosensitive camera through the fluorescent liquid, thus completing wall hanging and blockage detection of the blade synchronously.

(2) The engine turntable clamped in the positioning disc and the clamping claw is directly rotated, such that the turbine blades on the turntable can be automatically subjected to blockage and wall hanging detection without disassembly, and the blades on the turbine do not need to be detected one-by-one, so as to greatly improve the detection accuracy.

In the figures, 1—machine table, 2—fixing frame, 3—dip coating mechanism, 4—detection mechanism, 11—sliding cavity, 5—support plate, 6—chuck, 7—mounting barrel, 71—avoidance hole, 8—positioning disc, 9—cylinder, 10—connecting piece, 101—inclined hole, 12—clamping claw, 301—driving motor, 302—driving member, 303—driven member, 304—accommodating tank, 305—mounting plate, 306—toggle lever, 307—relief hole, 308—toggle plate, 309—blocking tooth, 310—chute, 311—sliding column, 312—first air inlet head, 313—sliding ring, 314—guide rod, 315—spring, 316—support rod, 317—abutting piece, 401—air-jet device, 402—vortex tube, 403—light shielding channel, 404—first photosensitive camera, 405—second photosensitive camera, 406—first flexible connecting tube, 407—mounting table, 408—second air inlet head, and 409—second flexible connecting tube.

DETAILED DESCRIPTION OF THE EMBODIMENTS

In order to make the technical means, creative features, objectives to be achieved, and efficacy achieved by the present disclosure easy to understand, the present disclosure will be further described below in combination with specific implementations.

Figure 1:
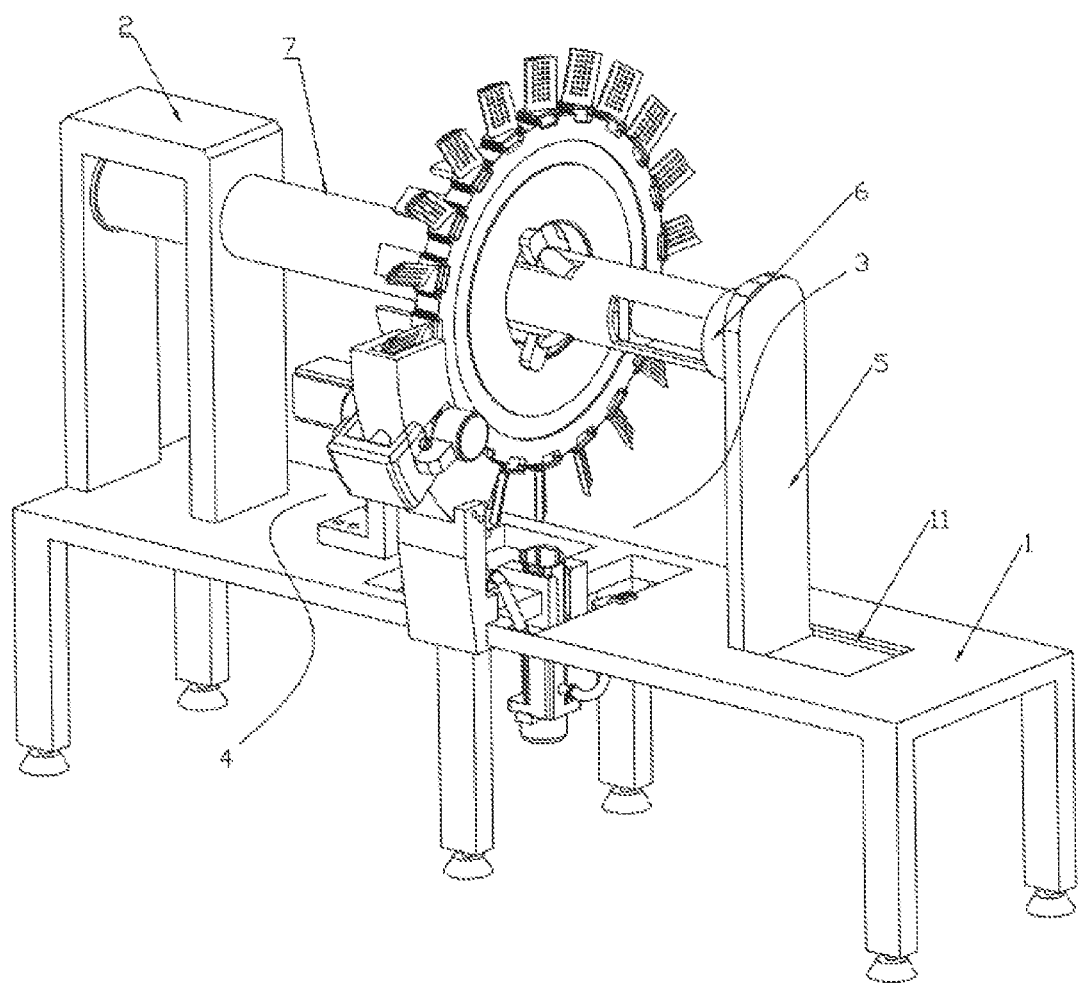
FIG. 1 is a schematic structural diagram of the present disclosure.
Figure 2:
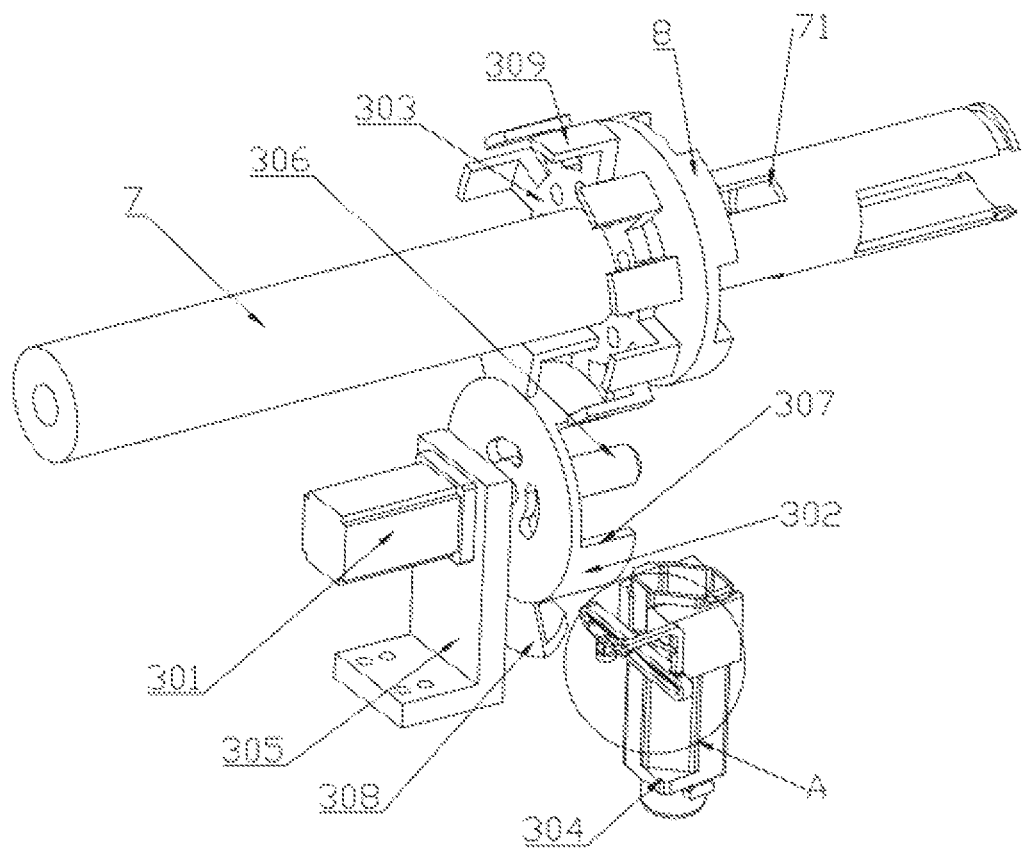
FIG. 2 is a schematic structural diagram of a dip coating mechanism in the present disclosure.
Figure 3:
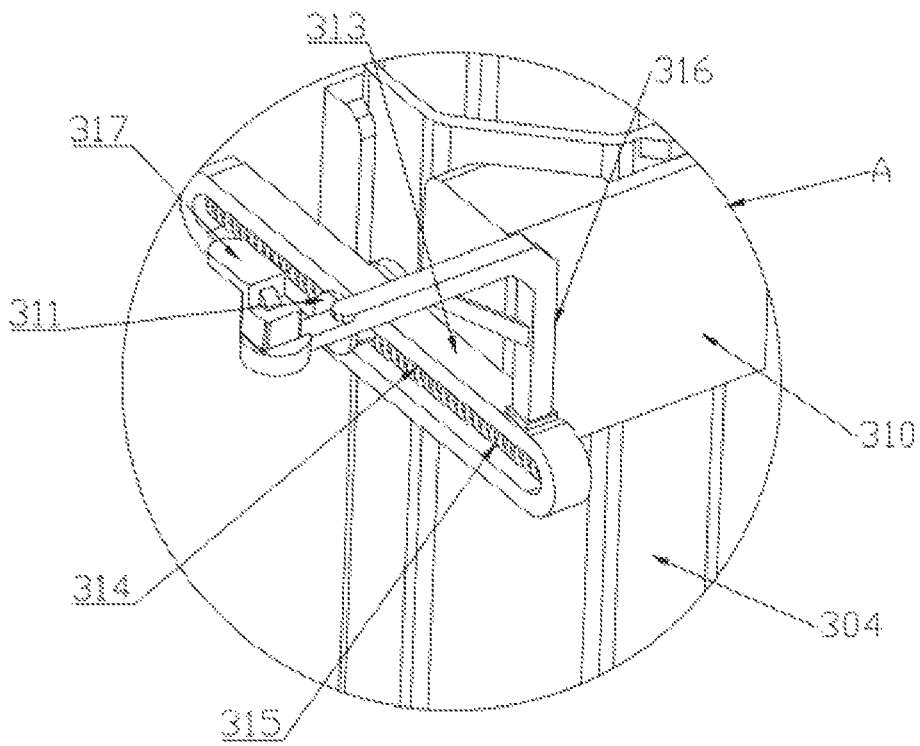
FIG. 3 is an enlarged view of A in FIG. 2.
Figure 4:
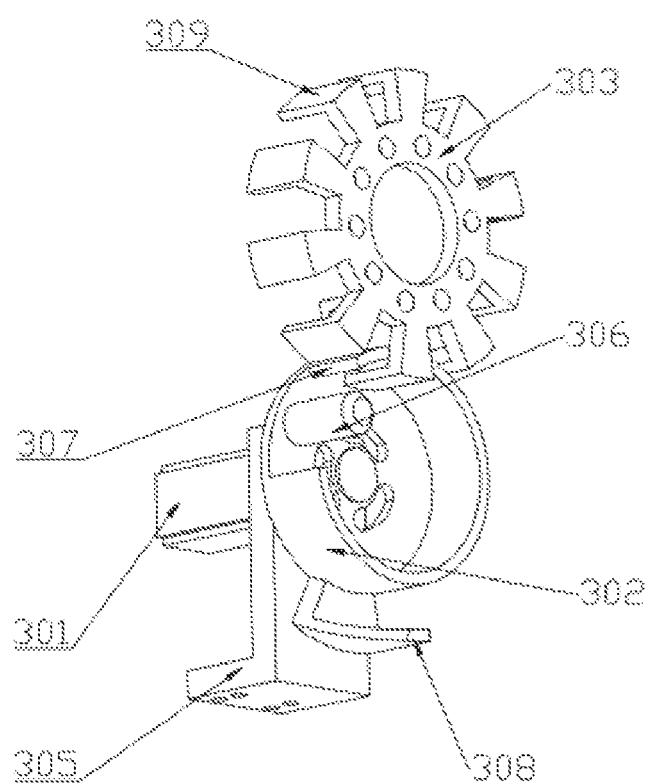
FIG. 4 is a schematic diagram of a partial structure in the dip coating mechanism in the present disclosure.
Figure 5:
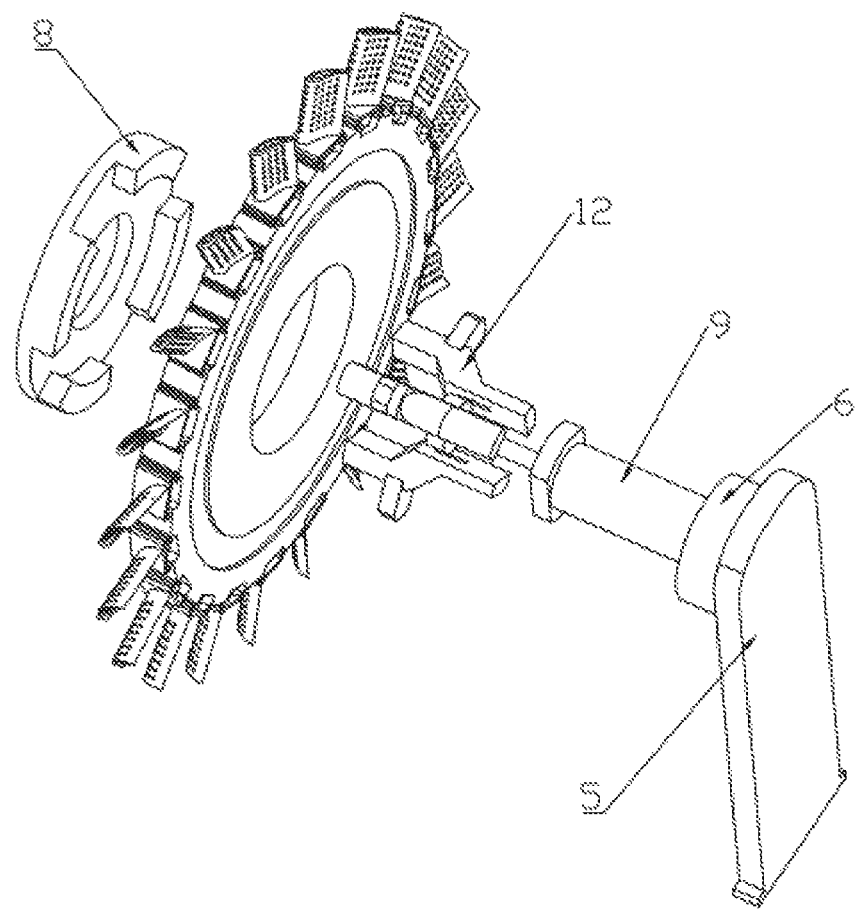
FIG. 5 is a split exploded view of a partial structure of a fixed engine turntable in the present disclosure.
Figure 6:
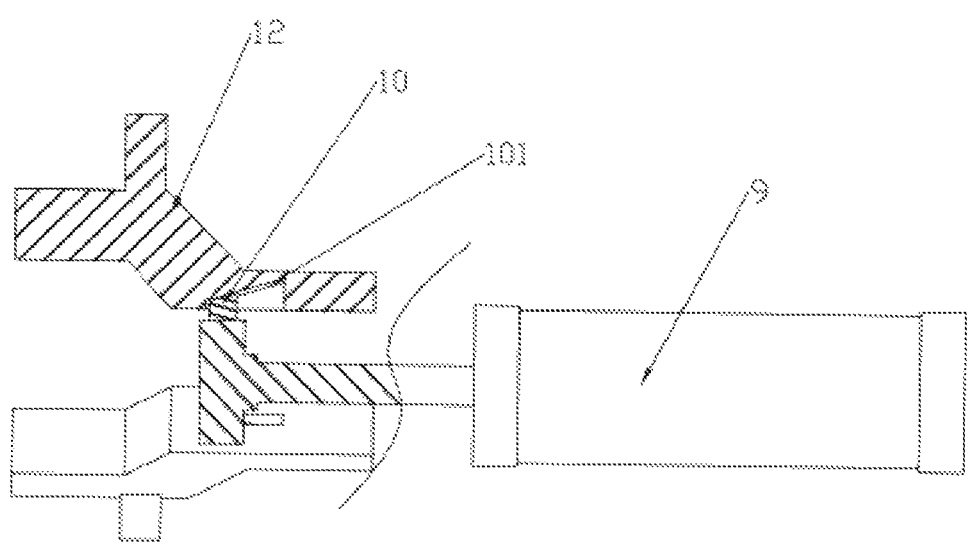
FIG. 6 is a schematic diagram of assembly of a cylinder and a clamping claw in the present disclosure.
Figure 7:
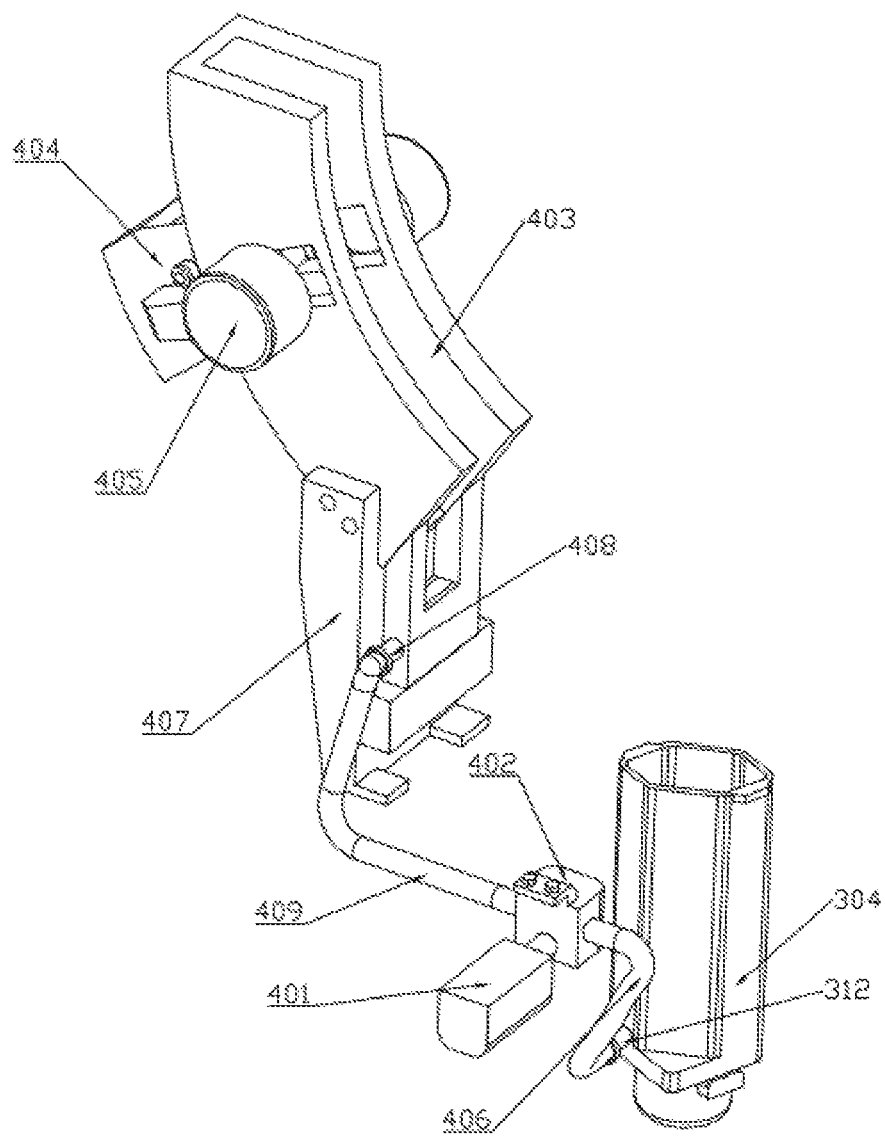
FIG. 7 is a schematic structural diagram of a detection mechanism in the present disclosure.
Figure 8:
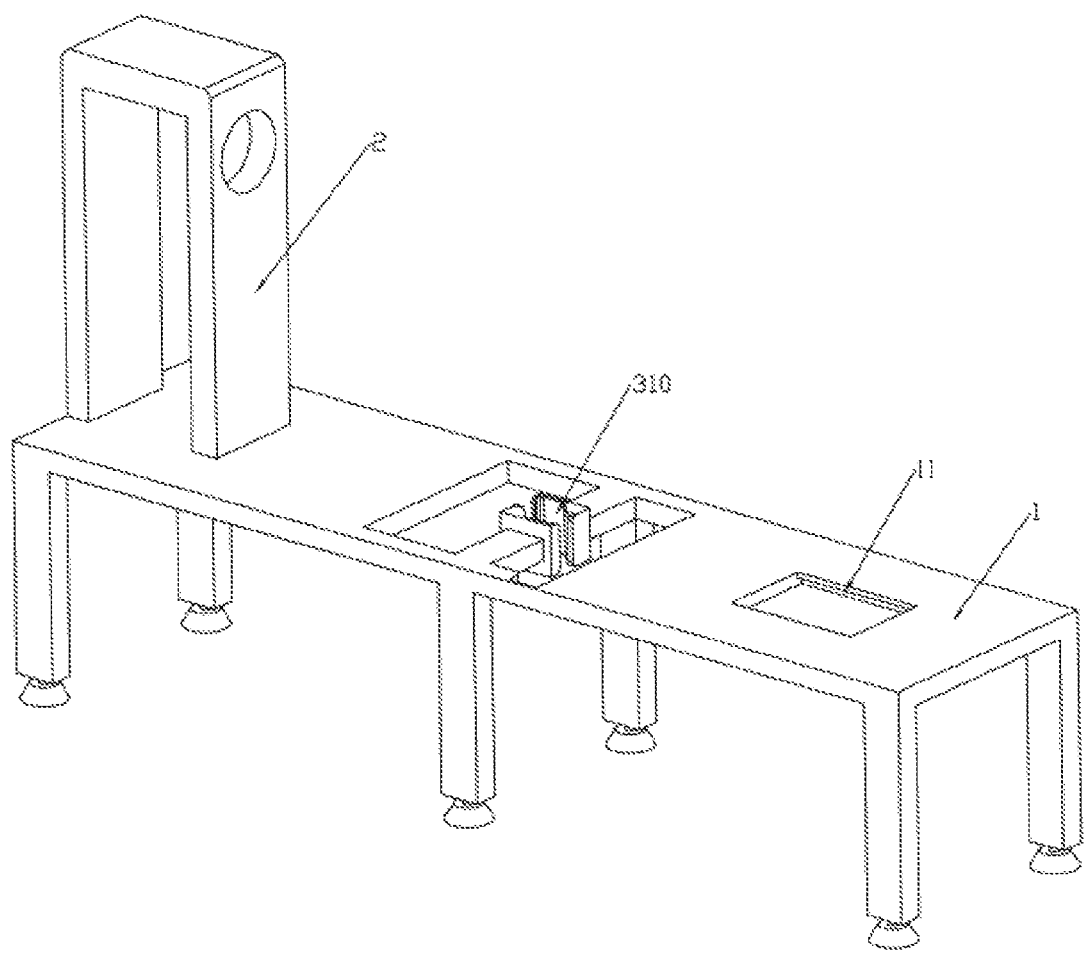
FIG. 8 is a schematic structural diagram of a machine table and a fixing frame in the present disclosure.

As shown in FIG. 1 to FIG. 8, a detection device for a turbine blade of an aircraft engine includes a machine table 1, a fixing frame 2, a dip coating mechanism 3, and a detection mechanism 4. A sliding cavity 11 is formed in an upper end of the machine table 1, a support plate 5 is slidably arranged in the sliding cavity 11, a side end of the support plate 5 is rotatably connected to a chuck 6, the fixing frame 2 is in an inverted "U" shape and is fixed on the upper end of the machine table 1, a mounting barrel 7 is rotatably arranged on the fixing frame 2, a plurality of avoidance holes 71 are circumferentially arranged in the mounting barrel 7, a positioning disc 8 is fixedly arranged on the mounting barrel 7, a cylinder 9 is mounted in the mounting barrel 7, an output end of the cylinder 9 is connected to a clamping claw 12 through a connecting piece 10, the clamping claw 12 is slidably arranged in the avoidance hole 71, an end of the mounting barrel 7 is also clamped on the chuck 6, the dip coating mechanism 3 is mounted on the machine table 1 and is configured to dip fluorescent liquid to a body of the turbine blade, and the detection mechanism 4 is mounted on a side end of the machine table 1 and is configured to detect a blockage degree of an air film hole on a turbine.

In the present embodiment, the dip coating mechanism 3 includes a driving motor 301, a driving member 302, a driven member 303 and an accommodating tank 304, the driving motor 301 is mounted on the machine table 1 through a mounting plate 305, the driving member 302 is mounted on an output end of the driving motor 301, the other end of the driving member 302 is fixed with a toggle lever 306, a relief hole 307 is formed in a side end of the driving member 302 where the toggle lever 306 is located, the side end of the driving member 302 is further fixed with two symmetrically arranged toggle plates 308, the driven member 303 is fixed on the mounting barrel 7, a plurality of blocking teeth 309 matched with the driving member 302 are evenly distributed at a side end of the driven member 303, two symmetrically arranged chutes 310 are fixed on the machine table 1, the accommodating tank 304 is slidably arranged in the chutes 310, an upper end and a lower end of the accommodating tank 304 are both limited to ends of the chutes 310, a side end of the accommodating tank 304 is fixed with two symmetrically arranged sliding columns 311, the side end of the accommodating tank 304 is connected to a first air inlet head 312, a sliding ring 313 is slidably arranged on the two sliding columns 311, a guide rod 314 is fixedly connected in the sliding ring 313, the two sliding columns 311 are both slidably arranged on the guide rod 314, two symmetrically arranged springs 315 are sleeved on the guide rod 314 between the sliding column 311 and an inner wall of the sliding ring 313, a support rod 316 is fixed on an upper end of the sliding ring 313, and an abutting piece 317 is arranged on the other end of the support rod 316 through a torsion spring.

It should be noted that the driving motor 301 is a servo motor and that the accommodating tank 304 is made of a metal heat-conducting material.

In the present embodiment, the detection mechanism 4 includes an air-jet device 401, a vortex tube 402, a light shielding channel 403, a first photosensitive camera 404, and a second photosensitive camera 405. The air-jet device 401 is mounted at a lower end of the machine table 1, the vortex tube 402 is also mounted on the machine table 1, an air inlet end of the vortex tube 402 is connected to the air-jet device 401, a cold air outlet of the vortex tube 402 is connected to the first air inlet head 312 through a first flexible connecting tube 406, the light shielding channel 403 is mounted on the machine table 1 through a mounting table 407, a second air inlet head 408 is mounted on the mounting table 407, a hot air outlet of the vortex tube 402 is connected to the second air inlet head 408 through a second flexible connecting tube 409, the first photosensitive camera 404 is arranged on a curved side end of the light shielding channel 403, and two second photosensitive cameras 405 are symmetrically arranged on two plane side ends of the light shielding channel 403, respectively.

It should be noted that the first photosensitive camera 404 and the second photosensitive camera 405 are symmetrically arranged, and detect a single blade simultaneously.

In the present embodiment, an end of the connecting piece 10 is inclined, an inclined hole 101 is formed inside the clamping claw 12, and the end of the connecting piece 10 is slidably arranged in the inclined hole 101, such that the output end of the cylinder 9 can drive the clamping claw 12 to extend and close in the avoidance hole 71.

In the present embodiment, the lower end of the accommodating tank 304 is connected to a liquid feeding pump, and when the accommodating tank 304 is moved up to an uppermost position, the turbine blade just drops below a fluorescent liquid level, such that each blade to be detected on the engine turntable can be immersed in the same height position of the fluorescent liquid, which has universal applicability.

In the present embodiment, end faces of the two toggle plates 308 are arranged obliquely, and when the abutting piece 317 is not in contact with the toggle plates 308, the abutting piece 317 is perpendicular to the support rod 316 under the action of the torsion spring, such that after the toggle plate 308 is rotated by a certain angle, the abutting piece 317 can fall off and be separated from the toggle plate 308, so as to reset the accommodating tank 304 and the sliding ring 313 to be ready for the next upward displacement.

It is worth noting that a width of a groove of the light shielding channel 403 is not less than a vertical projection width of the turbine blade, such that the turbine blade on the engine turntable will not collide with the inner wall of the light shielding channel 403 during rotation.

In addition, a lower end of the groove of the light shielding channel 403 corresponds to an air outlet port of the second air inlet head 408.

Working process and principle: During the use of the present disclosure, the support plate 5 clamped at the end of the mounting barrel 7 is first separated and is moved by a distance not less than the thickness of the engine turntable in the sliding cavity 11. The engine turntable is placed on the mounting barrel 7 through a manipulator, and abuts against the position of the positioning disc 8. The support plate 5 is pushed to continue to complete clamping with the end of the mounting barrel 7. Then the cylinder 9 is started to extend its output end, and the connecting piece 10 is pushed to slide in the inclined hole 101, such that the clamping claw 12 is fully extended in the avoidance hole 71, and the clamping claw abuts against the inner ring surface of the turntable in the process of translation and outward extension, and cooperates with the positioning disc 8 to clamp the turntable.

Then, the driving motor 301 is started to make its output end drive the driving member 302 to rotate. During synchronous rotation, the toggle lever 306 arranged in the driving member 302 will enter the gap between the two blocking teeth 309, and one of the blocking teeth 309 will enter into the interior of the driving member 302 through the relief hole 307 and slide relative to it. At the same time, the toggle plate 308 will rotate in another adjacent gap to rotate the driven member 303 while limiting the position, so as to realize intermittent regular rotation of the engine turntable on the mounting barrel 7 driven by the driven member 303. During the rotation of the driving member 302 for one cycle, the toggle plate 308 abuts against the abutting piece 317 arranged below twice, and drives the accommodating tank 304 to move upward through the support rod 316, the sliding ring 313, and the sliding column 311 until a lower limit part abuts against the lower end of the chute 310, so as to move the accommodating tank 304 fit with the blade upward, such that the low-temperature fluorescent liquid inside it can immerse the blade to be detected. After the toggle plate 308 arranged on the inclined surface of the side end is rotated to a certain height, the abutting piece 317 is rotated on the support rod 316 to be separated from the toggle plate 308, and the accommodating tank 304 slowly falls in the chute 310. Under the elastic force of the spring 315, the next toggle plate 308 can also be subjected to the above process, and the dipping coating is repeated twice to effectively adhere the fluorescent liquid in the air film hole. Then, the consumed fluorescent liquid is supplemented to the accommodating tank 304 synchronously through the lower liquid feeding pump.

The blade coated with the fluorescent liquid rotates in an orderly manner, and passes through the mounting table 407 at the lower end of the light shielding channel 403, and the second air inlet head 408 connected to it blows high-temperature hot air at the blade, such that the metal alloy blade heats up rapidly, while the sediment blocked or hung in the cooling channel and air film hole is non-metallic, so the temperature rise rate is slow compared with that of the blade. Since the fluorescence intensity of the fluorescent liquid is more sensitive to the influence of temperature, when the temperature drops, the fluorescence intensity increases, and when the temperature rises, the fluorescence intensity decreases, the fluorescent liquid hung on the sediment shows a higher fluorescence intensity than the fluorescent liquid on the blade. Under the obvious light dark contrast, the first photosensitive camera 404 and the second photosensitive camera 405 arranged on the light shielding channel 403 can clearly capture whether there is wall hanging or blockage of the cooling channel and air film hole in the blade.

Based on the above, in the present disclosure, the dip coating mechanism 3 and the detection mechanism 4 are arranged on the machine table 1, such that the driving member 302 rotates for one cycle to drive the engine turbine turntable to rotate synchronously for one cycle. In this process, the two symmetrically arranged toggle plates 308 will drive the accommodating tank 304 to reciprocate up and down twice, such that the turbine blades on the engine turntable can be immersed twice, so as to ensure that the high-temperature air generated in the vortex tube 402 can have sufficient time to heat the fluorescent liquid, and ensure that the high-temperature fluorescent liquid in the accommodating tank 304 is completely immersed in the small air film holes on the blades. For the blades to be detected, through the second air inlet head 408 mounted on the mounting table 407, the high-speed cold air generated in the vortex tube 402 can quickly quench the blade surface, such that wall-hanging sediments in the air film hole and the cooling channel will be exposed to the first photosensitive camera 404 and the second photosensitive camera 405 through the fluorescent liquid, thus completing wall hanging and blockage detection of the blade synchronously.

The engine turntable clamped in the positioning disc 8 and the clamping claw 12 is directly rotated, such that the turbine blades on the turntable can be automatically subjected to blockage and wall hanging detection without disassembly, and the blades on the turbine do not need to be detected one-by-one, so as to greatly improve the detection accuracy.

It is known from technical common sense that the present disclosure may be realized through other embodiments that do not deviate from its spiritual essence or necessary characteristics. Therefore, the above-disclosed embodiments are merely illustrative and not exclusive in all respects. All changes within the scope of the present disclosure or within a scope equivalent to the scope of the present disclosure shall be included within the present disclosure.

What is claimed is:

1. A detection device for a turbine blade of an aircraft engine, comprising:
    a machine table;
    a fixing frame;
    a dip coating mechanism; and
    a detection mechanism,
    wherein a sliding cavity is formed in an upper end of the machine table, a support plate is slidably arranged in the sliding cavity, a side end of the support plate is rotatably connected to a chuck, the fixing frame has a form of an upside down "U" shape relative to the machine table and is fixed on the upper end of the machine table, a mounting barrel is rotatably arranged on the fixing frame, a plurality of avoidance holes are circumferentially arranged in the mounting barrel, a positioning disc is fixedly arranged on the mounting barrel, a cylinder is mounted in the mounting barrel, an output end of the cylinder is connected to a clamping claw through a connecting piece, the clamping claw is slidably arranged in the plurality of avoidance holes, an end of the mounting barrel is clamped on the chuck, the dip coating mechanism is mounted on the machine table and is configured to dip fluorescent liquid to a body of the turbine blade, the detection mechanism is mounted on a side end of the machine table and is configured to detect a blockage degree of an air film hole on a turbine, wherein the detection mechanism comprises a first photosensitive camera; the dip coating mechanism comprises a driving motor, a driving member, a driven member and an accommodating tank, wherein the driving motor is mounted on the machine table through a mounting plate, the driving member is mounted on an output end of the driving motor, the other end of the driving member is fixed with a toggle lever, a relief hole is formed in a side end of the driving member where the toggle lever is located, the side end of the driving member is further fixed with two symmetrically arranged toggle plates, the driven member is fixed on the mounting barrel, a plurality of blocking teeth matched with the driving member are evenly distributed at a side end of the driven member, two symmetrically arranged chutes are fixed on the machine table, the accommodating tank is slidably arranged in the chutes, an upper end and a lower end of the accommodating tank are both limited to ends of the chutes, a side end of the accommodating tank is fixed with two symmetrically arranged sliding columns, the side end of the accommodating tank is connected to a first air inlet head, a sliding ring is slidably arranged on the two sliding columns, a guide rod is fixedly connected in the sliding ring, the two sliding columns are slidably arranged on the guide rod, two symmetrically arranged springs are sleeved on the guide rod between the sliding column and an inner wall of the sliding ring, a support rod is fixed on an upper end of the sliding ring, and an abutting piece is arranged on the other end of the support rod through a torsion spring.

2. The detection device for the turbine blade of the aircraft engine according to claim 1, wherein the detection mechanism further comprises an air-jet device, a vortex tube, a light shielding channel, and a second photosensitive camera, wherein the air-jet device is mounted at a lower end of the machine table, the vortex tube is mounted on the machine table, an air inlet end of the vortex tube is connected to the air-jet device, a cold air outlet of the vortex tube is connected to the first air inlet head through a first flexible connecting tube, the light shielding channel is mounted on the machine table through a mounting table, a second air inlet head is mounted on the mounting table, a hot air outlet of the vortex tube is connected to the second air inlet head through a second flexible connecting tube, the first photosensitive camera is arranged on a curved side end of the light shielding channel, and two second photosensitive cameras are symmetrically arranged on two plane side ends of the light shielding channel, respectively.

3. The detection device for the turbine blade of the aircraft engine according to claim 1, wherein an end of the connecting piece is inclined, an inclined hole is formed inside the clamping claw, and the end of the connecting piece is slidably arranged in the inclined hole.

4. The detection device for the turbine blade of the aircraft engine according to claim 1, wherein the lower end of the accommodating tank is connected to a liquid feeding pump, and when the accommodating tank is moved up to an uppermost position, the turbine blade just drops below a fluorescent liquid level.

5. The detection device for the turbine blade of the aircraft engine according to claim 1, wherein end faces of the two toggle plates are arranged obliquely, and when the abutting piece is not in contact with the toggle plates, the abutting piece is perpendicular to the support rod under an action of the torsion spring.

6. The detection device for the turbine blade of the aircraft engine according to claim 2, wherein a width of a groove of the light shielding channel is not less than a vertical projection width of the turbine blade.

7. The detection device for the turbine blade of the aircraft engine according to claim 6, wherein a lower end of the groove of the light shielding channel corresponds to an air outlet port of the second air inlet head.

\* \* \* \* \*